125,385

UNITED STATES PATENT OFFICE.

JOSIAH S. ELLIOTT, OF CHELSEA, AND JOHN F. WOOD, OF EVERETT, MASSACHUSETTS.

IMPROVEMENT IN COMPOSITION-STONES FOR SMUT-MACHINES.

Specification forming part of Letters Patent No. 125,385, dated April 9, 1872.

SPECIFICATION.

*To all whom it may concern:*

Be it known that JOSIAH S. ELLIOTT, of Chelsea, in the State of Massachusetts, and JOHN F. WOOD, of Everett, in said State, have invented an Improvement in Smut-Machines; and we do hereby declare the following to be a full and correct description of the same.

Our invention is applicable to any of the common smut-machines now in use.

It is well known that the metallic parts of a smut-machine which act directly upon the grain or other substance to be cleaned soon wear smooth and become inoperative, and many attempts have therefore been made to substitute stone for metal, or to line or coat the parts acting directly upon the grain with various grinding materials, more especially with emery-powder, which has been applied by means of gums and glues; but none of these substitutes have proved satisfactory.

We have found that the operative parts of a smut-machine may be lined or coated with an artificial stone, so as to hold their grinding power almost indefinitely, or may be made directly from artificial stone.

This is done in the following manner: Observing the instructions set forth in the several Letters Patent of the United States granted Stanislas Sorel for improvements in the manufacture of artificial stone and cement—viz., Letters Patent No. 53,092, dated March 6, 1866; Letters Patent No. 100,944, dated March 15, 1870; and Letters Patent No. 100,945, dated March 15, 1870—we use oxide of magnesium as a base, and mix with it, in a dry state, a powder reduced from burr-stone, emery, or any stone of excessive hardness and grit, substantially in the manner indicated in the first of the above-named patents, and afterward moisten the mixture, as in said patent directed, with chloride of magnesium, or with any of the equivalents thereof, as set forth in the last of the above-named patents. Or the oxide and chloride of zinc may be substituted for the oxide and chloride of magnesium, in which case we mix with the powdered stone, in a dry state, from about ten to about twenty per cent. in weight of the oxide of zinc, and moisten the mixture with the chloride of zinc until it will hold the shape given it by compressing in the hand. This mixture or cement is then applied to the inner surface of the cylinder or cone of the machine by molding, or tamping, or by a trowel, care being taken that the surface to which the cement is to adhere is of a rough nature; or the cylinder or cone may be made directly from the cement.

In like manner the revolving beaters may be formed directly from the cement by molding a shell with arms or strikers, the shell being rigidly secured to the revolving shaft, which passes through it; or slabs or blocks of the artificial stone molded from the cement or mixture may be set in sockets upon the revolving shaft; or the cement may be applied to the roughened metallic beaters by molding or by a trowel.

We claim—

In a smut-machine the use of an artificial stone, operating directly to clean the grain or other substance, prepared and applied substantially as described.

The above specification of our said invention signed and witnessed at Boston this 2d day of February, A. D. 1872.

J. S. ELLIOTT.
JNO. F. WOOD.

Witnesses:
WILLIAM W. SWAN,
H. FARNAM SMITH.